(12) United States Patent
Hartwich

(10) Patent No.: US 9,917,705 B2
(45) Date of Patent: Mar. 13, 2018

(54) DEVICE AND MEASURING METHOD FOR ASCERTAINING THE INTERNAL DELAY TIME OF A CAN BUS CONNECTION UNIT

(71) Applicant: Robert Bosch GmbH, Stuttgart (DE)

(72) Inventor: Florian Hartwich, Lerchenstr. (DE)

(73) Assignee: Robert Bosch GmbH, Stuttgart (DE)

(*) Notice: Subject to any disclaimer, the term of this patent is extended or adjusted under 35 U.S.C. 154(b) by 66 days.

(21) Appl. No.: 14/902,623

(22) PCT Filed: Jun. 11, 2014

(86) PCT No.: PCT/EP2014/062155
§ 371 (c)(1),
(2) Date: Jan. 4, 2016

(87) PCT Pub. No.: WO2015/000668
PCT Pub. Date: Jan. 8, 2015

(65) Prior Publication Data
US 2016/0173295 A1    Jun. 16, 2016

(30) Foreign Application Priority Data

Jul. 4, 2013  (DE) .................. 10 2013 213 128
Sep. 10, 2013 (DE) .................. 10 2013 218 075

(51) Int. Cl.
*H04L 12/413*  (2006.01)
*H04L 12/26*   (2006.01)
(Continued)

(52) U.S. Cl.
CPC ........ *H04L 12/4135* (2013.01); *H04L 7/0041* (2013.01); *H04L 43/0852* (2013.01); *H04L 2012/40215* (2013.01)

(58) Field of Classification Search
None
See application file for complete search history.

(56) References Cited

U.S. PATENT DOCUMENTS 6,385,210 B1 * 5/2002 Overberg ............. H04L 12/413
                                                    370/447
7,430,261 B2 * 9/2008 Forest ................... H04L 12/417
                                                    370/392
(Continued)

FOREIGN PATENT DOCUMENTS

DE      10 000 305         7/2001
DE      10 2012 200997     2/2013

OTHER PUBLICATIONS

Hartwich, Florian, "CAN with Flexible Data-Rate," iCC 2012, Mar. 5-6, 2012, pp. 14-1 to 14-9.*
(Continued)

*Primary Examiner* — Charles C Jiang
*Assistant Examiner* — Rose Clark
(74) *Attorney, Agent, or Firm* — Norton Rose Fulbright US LLP; Gerard Messina

(57) ABSTRACT

A device is provided for ascertaining the internal delay time of a CAN bus connection unit in a bus system including user stations exchanging messages via a bus, the transmission access to the bus for each message being assigned using an arbitration method according to CAN standard ISO 11898-1 to one user station which becomes the transmitter for this message. The device includes a unit for ascertaining the internal delay time using one of (i) a delay counter for ascertaining the delay time between a transmission signal and a reception signal, the delay counter being stopped if the reception signal has a dominant level and the counter content of the delay counter is greater than/equal to a predefined configuration value, or (ii) the maximum and minimum delay times of the bus connection unit.

4 Claims, 2 Drawing Sheets

(51) Int. Cl.
*H04L 7/00* (2006.01)
*H04L 12/40* (2006.01)

(56) References Cited

U.S. PATENT DOCUMENTS

| | | | | |
|---|---|---|---|---|
| 9,043,078 B2* | 5/2015 | Johnson | ................. | G07C 5/008 |
| | | | | 701/32.7 |
| 2003/0084363 A1* | 5/2003 | Barrenscheen | ....... | G06F 11/221 |
| | | | | 713/400 |
| 2004/0081079 A1* | 4/2004 | Forest | .................. | H04L 12/417 |
| | | | | 370/216 |
| 2010/0008456 A1* | 1/2010 | Rohatschek | ............ | H04L 25/08 |
| | | | | 375/354 |

OTHER PUBLICATIONS

TJA1050 High Speed CAN Transceiver Data Sheet, Oct. 22, 2003, pp. 1-18.*
International Search Report for PCT/EP2014/062155, dated Aug. 20, 2014.
Hiboyuki Mori et al. "Novel ringing suppression circuit to increase the number of connectable ECUs in a linear passive star CAN" Electromagnetic Compatibility, 2012 International Sympposium on IEEE, Sep. 17, 2012, pp. 1-6.
NVE Corporation, "IL41050TA Datasheet—High-Speed, Low Power Isolated CAN Tranceiver/Rev.G".
Florian Hartwich, "CAN with Flexible Data-Rate", Proceedings of the 13$^{th}$ International CAN Conference, Mar. 14, 2012.

* cited by examiner

DEVICE AND MEASURING METHOD FOR ASCERTAINING THE INTERNAL DELAY TIME OF A CAN BUS CONNECTION UNIT

BACKGROUND OF THE INVENTION

1. Field of the Invention

The present invention relates to a device and a measuring method for ascertaining the internal delay time of a CAN bus connection unit or a CAN transceiver.

2. Description of the Related Art

Published German patent application document DE 10 000 305 A1 describes the CAN (Controller Area Network) as well as an extension of the CAN referred to as TTCAN (Time-Triggered CAN). The media access control method used in the CAN is based on bitwise arbitration. In the CAN, the bitwise arbitration is carried out based on a leading identifier within the message to be transmitted via the bus.

As already described in published German patent application document DE 10 2012 200 997, multiple user stations may simultaneously transmit data via the bus system during the bitwise arbitration, without hereby interfering with the data transmission. When transmitting a bit via the bus (transmission signal), the user stations are able to ascertain the logical state (0 or 1) of the bus (reception signal) in parallel. For this purpose, the transmission signal transmitted on the transmission channel is continuously compared with the reception signal. If there is no match at a certain point in time, the sample point, the bus user terminates its transmitting operation, as it must be assumed that a different bus user is attempting to transmit a message having a higher priority or a lower-level identifier.

The reception signal constitutes a superimposition of the message bits of all bus users which are attempting to gain access to the bus during the arbitration. Because of the propagation times of the signals on the bus lines and because of intrinsic delay times in the bus connection units (transceivers), the result of the superimposition of these signals is present only late within the bit period, so that the sample point must be relatively far back within the bit period. Among other things, this fact limits the allowable bit lengths downward in the CAN. A shortening is not readily possible.

Published German patent application document DE 10 2012 200 997 describes how a secondary sample point (SSP) is used to detect bit errors on a CAN bus. In order to determine the position of the SSP, the internal delay time of a CAN bus connection unit or a CAN transceiver DELTA_T may be measured with the aid of a particular method which is described in published German patent application document DE 10 2012 200 997.

The laboratory evaluation of the method described in published German patent application document DE 10 2012 200 997 has demonstrated that in the case of heavily disturbed signals on the CAN bus, measuring errors may occur during the ascertainment of the internal delay time of a CAN bus connection unit or a CAN transceiver.

BRIEF SUMMARY OF THE INVENTION

Therefore, the object of the present invention is to provide a device and a measuring method for ascertaining the internal delay time of a CAN bus connection unit, which address the aforementioned problems of the related art. In particular, a device and a measuring method for ascertaining the internal delay time of a CAN transceiver or a CAN bus connection unit are to be provided which do not generate any measuring errors during the ascertainment of the internal delay time of a CAN transceiver or a CAN bus connection unit.

This object is achieved via a device for ascertaining the internal delay time of a CAN bus connection unit. A correct function of a serial data transmission in a bus system including at least two user stations may thereby be checked. Here, each user station is connected to the bus via a bus connection unit and may exchange messages via the bus, the transmission access to the bus for each message being assigned with the aid of the arbitration method according to CAN standard ISO 11898-1 to one user station, which becomes the transmitter for this message. The device includes a unit for ascertaining the internal delay time using a delay counter for ascertaining the delay time between a transmission signal and a reception signal, the delay counter being stopped if the reception signal has a dominant level and the counter content of the delay counter is greater than/equal to a predefined configuration value; or for ascertaining the internal delay time based on the maximum and minimum delay times of the bus connection unit.

Thus, the present invention describes a device which may carry out a measuring method which is able to suppress certain disturbances on the CAN bus. As a result, measuring errors do not occur during the ascertainment of the internal delay time of a CAN transceiver or a CAN bus connection unit, even in the case of heavily disturbed signals on the CAN bus.

According to the present invention, a new configuration parameter is introduced which determines the time window in which disturbances on the CAN bus are suppressed. This has the advantage that the value of the new parameter is set to a suitable value based on an analysis of the CAN bus or network. As a result, the robustness of the system is increased.

The minimum delay time may be a value which is a function of the configuration value.

In the device, the position of an SSP is predefinable, at which a comparison of a transmission signal transmitted to the bus connection unit with a reception signal received by the bus connection unit is carried out.

The device possibly includes a delay unit for generating an undelayed transmission signal or a transmission signal delayed by a predetermined time delay, and/or a comparison unit for comparing a transmission signal transmitted to the bus connection unit with a reception signal received by the bus connection unit, in order to check the correct function of the data transmission during the transmission.

In addition, the device may include a switching unit for switching between the undelayed transmission signal and the transmission signal delayed by a predetermined time delay, so that the comparison unit may use either the undelayed transmission signal or the transmission signal delayed by the predetermined time delay for checking the correct function of the data transmission.

The aforementioned object is also achieved via a measuring method for ascertaining the internal delay time of a CAN bus connection unit having the features of Patent Claim 6. A correct function of a serial data transmission in a bus system including at least two user stations may thereby be checked. Here, each user station is connected to the bus via a bus connection unit and may exchange messages via the bus, the transmission access to the bus for each message being assigned with the aid of the arbitration method according to CAN standard ISO 11898-1 to one user station, which becomes the transmitter for this message. The method ascertains the internal delay time using a delay counter for ascertaining the delay time between a transmission signal and a reception signal, the delay counter being stopped if the reception signal has a dominant level and the counter content of the delay counter is greater than/equal to a predefined configuration value, or ascertains the internal delay time based on the maximum and minimum delay times of the bus connection unit.

The measuring method is carried out via the previously described device and therefore provides the same advantages as the device.

In the measuring method, the minimum delay time may be a value which is a function of the configuration value.

The position of an SSP is possibly predefined, at which a comparison of a transmission signal transmitted by the bus connection unit with a reception signal received by the bus connection unit is carried out.

In the measuring method, a generation of an undelayed transmission signal or a transmission signal delayed by a predetermined time delay, and/or a comparison of a transmission signal transmitted to the bus connection unit with a reception signal received by the bus connection unit, may also be carried out, in order to check the correct function of the data transmission during the transmission.

In the step of comparing the measuring method, either the undelayed transmission signal or the transmission signal delayed by the predetermined time delay may be used for checking the correct function of the data transmission.

Additional possible implementations of the present invention also include combinations, which are not explicitly mentioned, of features or specific embodiments described previously or below with respect to the exemplary embodiments. Those skilled in the art will also add individual aspects or improvements or enhancements to each basic form of the present invention.

DETAILED DESCRIPTION OF THE INVENTION

Figure 1:
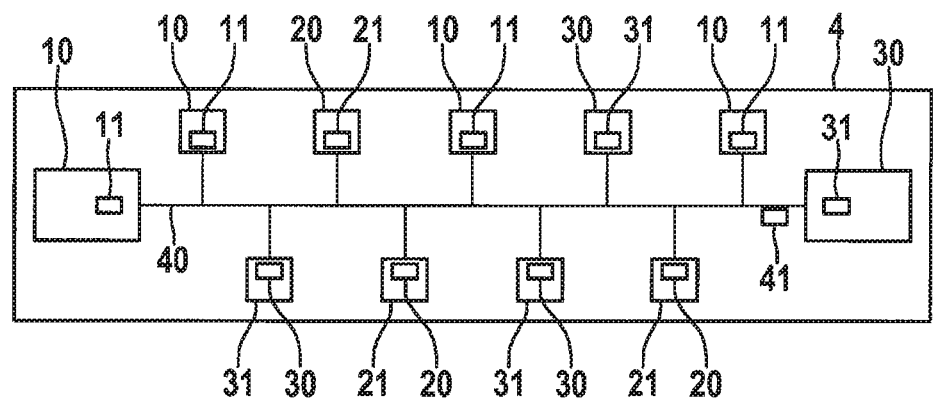
FIG. 1 shows a simplified block diagram of a bus system according to a first exemplary embodiment.

In the figures, identical or functionally identical elements are provided with the same reference numerals unless stated otherwise.

FIG. 1 shows a bus system 4 which, for example, may be a CAN bus system which may be used in a vehicle, in particular a motor vehicle, an airplane, etc., or in hospitals, etc. Bus system 4 includes a device 5 and a plurality of user stations 10, 20, 30, each being connected to a bus 40 with the aid of a transceiver or a bus connection unit 11, 21, 31. Data, for example, in the form of messages 41 or signals, may be transmitted between individual user stations 10, 20, 30 via bus 40 according to the CAN specification in ISO11898. User stations 10, 20, 30, which are also referred to as nodes, may, for example, be control units or display devices of a motor vehicle.

Figure 2:
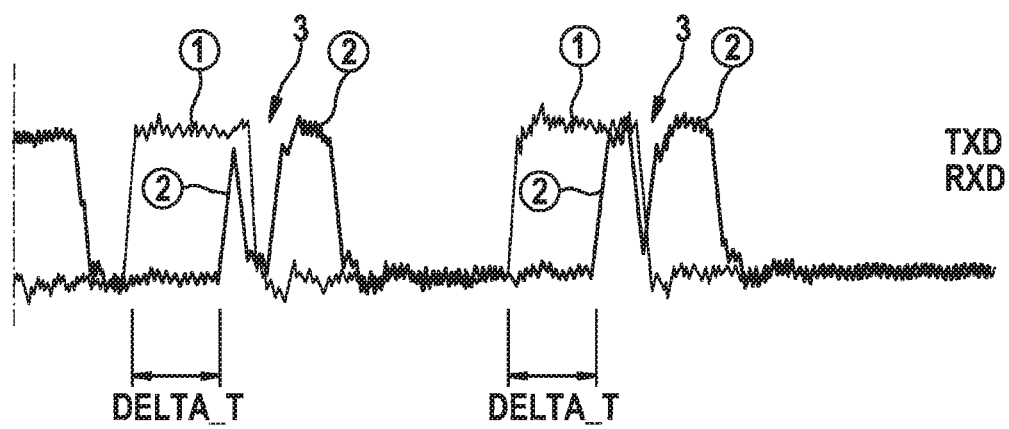
FIG. 2 shows a time profile diagram for illustrating the difference between the transmission signal and the reception signal in a CAN.

FIG. 2 shows the result of a laboratory analysis of transmission characteristics of a particular CAN bus topology. In FIG. 2, signal TXD, which is labeled as 1, is the digital input signal or transmission signal (CAN_TX) of a transceiver of one of user stations 10, 20, 30. A signal RXD, which is labeled as 2 in FIG. 2, is the digital output signal or reception signal (CAN_RX) of a transceiver of one of user stations 10, 20, 30, and indicates the CAN bus level. The lower level is dominant here, and the upper level is recessive. Transmission signal CAN_TX and reception signal CAN_RX are the interface signals between the digital protocol controller of one of user stations 10, 20, 30 and the analogous transceiver or bus connection unit 11, 21, 31, which are two separate integrated circuits (ICs) in most CAN nodes or user stations. CAN_TX is the output of the protocol controller and the input of one of bus connecting units 11, 21, 31; CAN_RX is the output of one of bus connecting units 11, 21, 31 and the input of the protocol controller. The transceiver also returns the TX signal to the RX signal, but with a delay. This delay is measured in the protocol controller according to the method which is described in greater detail below.

In the case of FIG. 2, the transmitter of an individual recessive bit, the transmitter, for example, being one of user stations 10, 20, 30, sees a brief dip 3 toward dominant due to reflections within this bit. Such a single recessive bit having a dip 3 is also referred to below as a disturbed bit.

The EDL bit, at the end of which delay time DELTA_T of a CAN transceiver is measured according to DE 10 2012 200 997, is such an individual recessive bit. Dominant bits IDE or r1/RTR precede, and r0 follows, as described in DE 10 2012 200 997.

FIG. 2 shows such disturbed bits. In the signals in FIG. 2, the low level is dominant, and the high level is recessive. In FIG. 2, signal RXD shows dips 3 following the rising flanks. Delay time DELTA_T from the input signal or transmission signal CAN_TX to the output signal or reception signal CAN_RX is clearly apparent.

At the first depicted recessive bit, which is depicted on the left side in FIG. 2, the dip toward dominant comes somewhat earlier; at the second depicted recessive bit, which is depicted in the center in FIG. 2, it comes somewhat later. The second case is the one in which the measurement of delay time DELTA_T is disturbed. Here, the falling flank of dip 3 at reception signal CAN_RX occurs almost simultaneously with the falling flank of transmission signal CAN_TX. Since, in DE 10 2012 200 997, the measurement of the falling flank of transmission signal CAN_TX takes place up to the falling flank of reception signal CAN_RX, the measuring result would be zero in this case.

Figure 3:
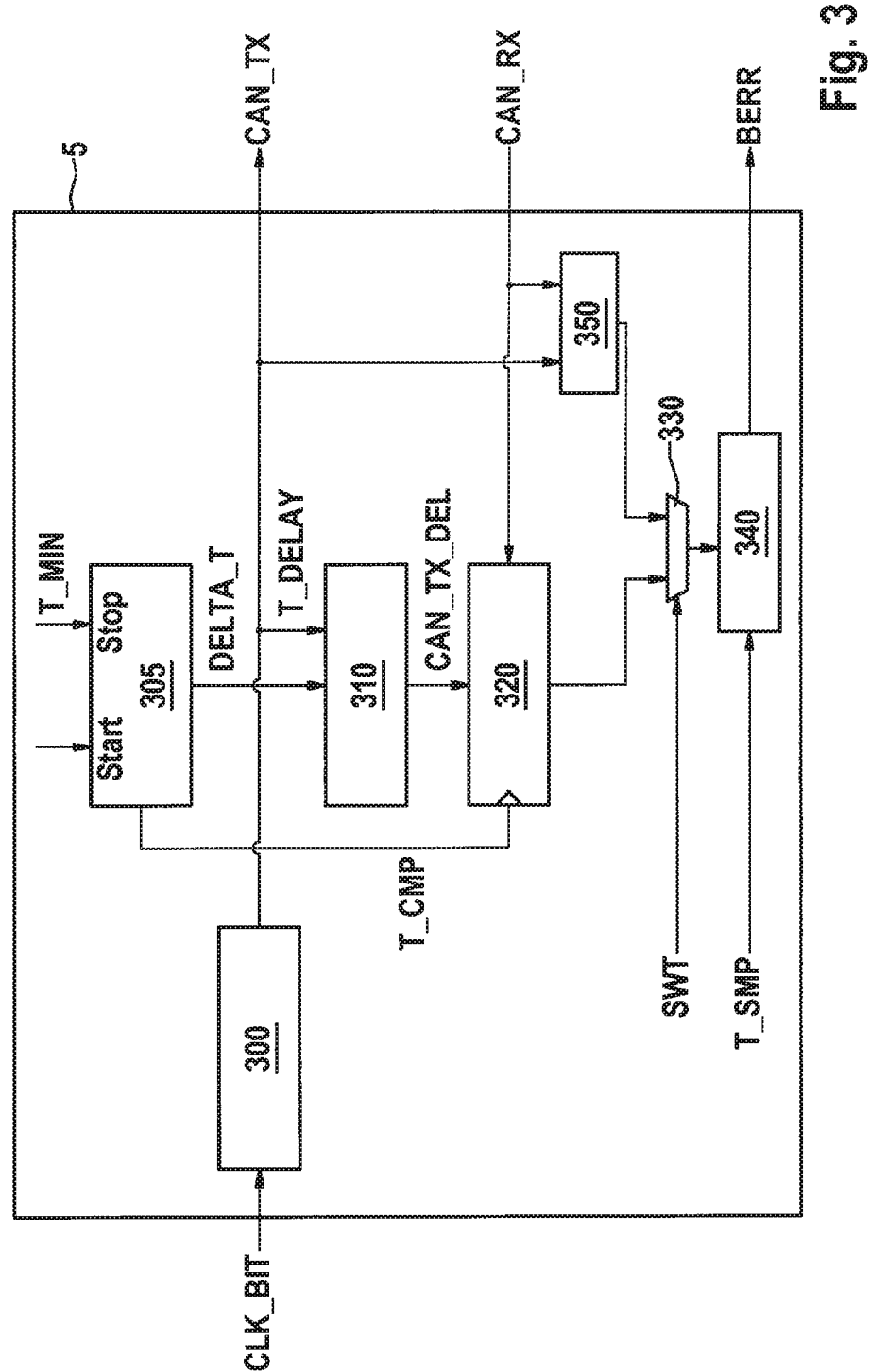
FIG. 3 shows a schematic block diagram of a device according to the first exemplary embodiment.

FIG. 3 shows a device 5 which is able to carry out a method according to the present exemplary embodiment. Device 5 may be included in the respective bus connection unit 11, 21, 31 or provided in addition. Device 5 includes a transmission shift register 300, a delay counter 305, a delay unit 310, a comparison unit 320, a switching unit 330, an evaluation unit 340, and a standard comparator 350. Of course, individual items of these integral parts may also be implemented in a combined or integrated manner.

With each bit clock, i.e., once per bit length, one bit of the serial data stream to be transmitted is output from transmission shift register 300, which is controlled via a connection to bit clock CLK_BIT, to the bus connection unit as a transmission signal CAN_TX via the corresponding connecting line. Reception signal CAN_RX, which is received by the bus connection unit or the transceiver via a connecting line, is present at comparison unit 320 and standard comparator 350. By evaluating suitable flanks, for example, the flank between EDL and r0 of transmission signal CAN_TX and reception signal CAN_RX, a start signal for delay counter 305 is generated in device 5. In addition, another configuration value is predefined, a value T_MIN. Delay counter 305 is stopped only if CAN_RX is dominant and the counter content is greater than/equal to T_MIN. Delay counter 305 may then, for example, ascertain a time delay or delay time DELTA_T by counting oscillator cycles of an oscillator which is present.

The value of T_MIN is chosen in such a way, according to measurements during the system development, that the dip at the CAN_RX signal is reliably completed if the counter content reaches T_MIN.

Furthermore, delay counter 305 generates a comparison point T_CMP as a function of measured delay time DELTA_T. For example, this comparison point T_CMP may be generated as the sum of ascertained delay time DELTA_T and a predefined or predefinable percentage of the bit length, in particular half the bit length. Comparison point T_CMP defines the point in time at which the XOR operation between delayed transmission signal CAN_TX_DEL and reception signal CAN_RX is evaluated in comparison unit 320.

Delay unit 310 generates or produces a transmission signal CAN_TX_DEL, which is delayed by a time delay T_DELAY, from transmission signal CAN_TX and delay time DELTA_T which is transmitted to it by delay counter 305. In a particularly simple implementation, time delay T_DELAY may be an integral multiple of the (short) bit length, so that delay unit 310 shifts the bit sequence by only one bit or multiple bits. This is particularly simple to implement via suitable hardware registers. Comparison unit 320 receives reception signal CAN_RX and delayed transmission signal CAN_TX_DEL. Furthermore, comparison unit 320 receives a piece of information T_CMP from delay counter 305 about a suitable comparison point at which the comparison result between reception signal CAN_RX and delayed transmission signal CAN_TX_DEL is to be sampled. Comparison unit 320 thus generates an output signal which represents the result of the comparison and which is conveyed to switching unit 330, for example, a multiplexer. In parallel, standard comparator 350, which, for example, may be provided as an XOR gate, generates a second output signal which represents the result of the comparison between CAN_TX and CAN_RX and which is also conveyed to switching unit 330.

In device 5, switching unit 330 switches between the two signals, for example, via a suitable signal SWT and/or based on established specifications, which may include, for example, the reaching or the evaluation of a predefined or predefinable bit, so that either the output signal of standard comparator 350 or comparison unit 320 is present at evaluation unit 340. For example, in device 5, switching unit 330 switches according to the BRS bit of a CAN signal if a switchover to shorter bit lengths exists. In evaluation unit 340, each signal which is switched through via switching unit 330 is then sampled at configured sample point T_SMP and, if necessary, a bit error signal BERR is generated if no match was detected.

As is apparent, a reliable check of the correct data transmission is possible via device 5 in the depicted embodiment, even in the case of the short bit lengths and even in the case of disturbed bits.

According to the present exemplary embodiment, a measuring method and a check of the correct function of a serial data transmission in a bus system 4 including at least two bus users, for example, user stations 10, 20, 30, are demonstrated using device 5. The bus users or user stations 10, 20, 30 are connected to bus 40 via a transceiver or a bus connection unit 11, 21, 31 and may exchange messages 41 via bus 40, the transmission access to bus 40 for each message 41 being assigned with the aid of the arbitration method according to CAN standard ISO 11898-1 to one bus user, one of user stations 10, 20, 30, the bus user becoming the transmitter for this message 41. Here, messages 41 have a logical structure according to the CAN standard, and are thus configured from the Start-of-Frame bit, the Arbitration field, the Control field, the Data field, the CRC field, the Acknowledge field, and the End-of-Frame field. Here, the correct function of the data transmission during the transmission is checked via a comparison of a transmission signal CAN_TX transmitted to bus connection unit 11, 21, 31 with reception signal CAN_RX received by bus connection unit 11, 21, 31, a transmission signal CAN_TX_DEL delayed by a delay time DELTA_T with respect to transmission signal CAN_TX being provided in the transmitter, and undelayed transmission signal CAN_TX or transmission signal CAN_TX_DEL delayed by time delay T_DELAY being used for the check of the correct function of the data transmission, as a function of a switchover. Here, a configuration value T_MIN is predefined, so that a value which is a function of configuration value T_MIN is used as a minimum value of delay time DELTA_T.

According to a second exemplary embodiment, the measurement of delay time DELTA_T is entirely omitted. Instead, the position of secondary sample point SSP is fixedly predefined. In order to predefine a fixed position, it is necessary to know both maximum and minimum internal delay time DELTA_T of a CAN transceiver, and these two values must not be too far apart from each other. Until now, there has been only one specification for the maximum in the data sheets of the transceiver. Therefore, in this case, the minimum is also specified in the data sheet.

Thus, according to the present exemplary embodiment, the measurement may also be omitted, and a delay time DELTA_T is then predefined, whose value lies between the minimum and maximum delay times known from the data sheet of bus connection unit 11, 21, 31.

The enhancement described here of a CAN controller of the respective user station 10, 20, 30 may be used in particular for CAN FD (CAN with Flexible Data Rate) and for TTCAN FD (TTCAN with Flexible Data Rate) networks.

All previously described embodiments of bus system 4, device 5, user stations 10, 20, 30, and the measuring method may be used separately or in all possible combinations. Any arbitrary combination of the features of the first and the second exemplary embodiment is possible. In addition, in particular, the following modifications are conceivable.

The number and arrangement of user stations 10, 20, 30 in bus system 4 of the exemplary embodiments is arbitrary.

The previously described device 5 and the measuring method carried out by it may also be used in a modified data protocol, which was published on 2 May 2011 on the Internet page www.semiconductor.bosch.de in the document "CAN with Flexible Data Rate, White Paper, Version 1.0, and which, among other things, enables an enlargement of the data field, as well as a shortening of the bit length for a portion of the CAN message after arbitration has been carried out.

What is claimed is:

1. A device for checking a correct function of a serial data transmission in a Controller Area Network (CAN) bus system including at least two user stations which are each connected to a bus via a respective bus connection unit and are able to exchange messages via the bus, transmission access to the bus for each message being assigned with the aid of the arbitration method according to CAN standard ISO 11898-1 to a selected user station which assumes a transmitter role for the selected message, wherein the device comprises:
- a delay counter which ascertains a delay time between a CAN transmission signal and a CAN reception signal, the delay counter being stopped only if both (i) the reception signal has a dominant level, and (ii) a counter content of the delay counter is not less than a predefined configuration value;
- a delay unit which receives the ascertained delay time from the delay counter and generates a delayed transmission signal based on the CAN transmission signal and the ascertained delay time;
- a comparison unit that compares the CAN reception signal with the delayed transmission signal; and
- an evaluation unit which generates an error signal based on results from the comparison unit.

2. A method for checking a correct function of a serial data transmission in a Controller Area Network (CAN) bus system including at least two user stations which are each connected to a bus via a respective bus connection unit and are able to exchange messages via the bus, transmission access to the bus for each message being assigned with the aid of the arbitration method according to CAN standard ISO 11898-1 to a selected user station which assumes a transmitter role for the selected message, the method comprising:
- counting a time delay, using a delay counter, to ascertain a delay time between a CAN transmission signal and a CAN reception signal, the delay counter being stopped only if both (i) the reception signal has a dominant level, and (ii) a counter content of the delay counter is not less than a predefined configuration value;
- generating a delayed transmission signal based on the CAN transmission signal and the ascertained delay time;
- comparing the CAN reception signal with the delayed transmission signal; and
- generating an error signal based on results of the comparing.

3. The device as recited in claim 1, wherein the delay counter ascertains the delay time by counting oscillator cycles of an oscillator from the time a start of the delay counter is triggered until the delay counter is stopped.

4. The method as recited in claim 2, wherein the counting the time delay includes counting, by the delay counter, oscillator cycles of an oscillator from the time a start of the delay counter is triggered until the delay counter is stopped.

* * * * *